United States Patent
Kim et al.

(10) Patent No.: US 9,092,456 B2
(45) Date of Patent: Jul. 28, 2015

(54) METHOD AND SYSTEM FOR RECONSTRUCTING IMAGE HAVING HIGH RESOLUTION

(75) Inventors: Jaewon Kim, Goyang-si (KR); Ig Jae Kim, Seoul (KR); Sang Chul Ahn, Seoul (KR); Jong-Ho Lee, Cheongju-si (KR)

(73) Assignee: Korea Institute of Science and Technology, Seoul (KR)

( * ) Notice: Subject to any disclaimer, the term of this patent is extended or adjusted under 35 U.S.C. 154(b) by 198 days.

(21) Appl. No.: 13/545,085

(22) Filed: Jul. 10, 2012

(65) Prior Publication Data

US 2013/0044962 A1 Feb. 21, 2013

(30) Foreign Application Priority Data

Aug. 16, 2011 (KR) ........................ 10-2011-0081157

(51) Int. Cl.
*G06T 3/40* (2006.01)
*G06F 17/30* (2006.01)

(52) U.S. Cl.
CPC .... *G06F 17/30247* (2013.01); *G06F 17/30265* (2013.01); *G06T 3/4053* (2013.01)

(58) Field of Classification Search
None
See application file for complete search history.

(56) References Cited

U.S. PATENT DOCUMENTS

| | | | | |
|---|---|---|---|---|
| 2005/0270299 A1* | 12/2005 | Rasmussen et al. | .......... | 345/552 |
| 2007/0182751 A1* | 8/2007 | Rasmussen et al. | .......... | 345/562 |
| 2009/0198767 A1* | 8/2009 | Jakobson et al. | ............. | 709/203 |
| 2010/0054527 A1* | 3/2010 | Kirmse et al. | ................ | 382/100 |
| 2010/0226593 A1* | 9/2010 | Gerhard et al. | ............... | 382/299 |

FOREIGN PATENT DOCUMENTS

KR 10-2001-0044255 A 6/2001
KR 10-2012-0002294 A 1/2012

OTHER PUBLICATIONS

Korean Intellectual Properety Office Notice of Allowance issued Mar. 12, 2013 in counterpart Korean Patent Application No. 10-2011-081157 (5 pages incluiding Engilish Translation).

* cited by examiner

*Primary Examiner* — Amir Alavi
*Assistant Examiner* — Alexander J Lesnick
(74) *Attorney, Agent, or Firm* — NSIP Law

(57) ABSTRACT

A method and system for reconstructing an image displayed on an electronic device connected to a network, to be a high resolution image. The method of reconstructing a selected area of the image displayed on the electronic device connected to a network, to be a high resolution image, includes: receiving a request to expand the selected area; collecting images including the selected area from the Internet; correcting the selected area to have a high resolution while expanding the selected area based on the collected images; and displaying the image expanded to have a high resolution on the electronic device.

25 Claims, 11 Drawing Sheets

METHOD AND SYSTEM FOR RECONSTRUCTING IMAGE HAVING HIGH RESOLUTION

CROSS-REFERENCE TO RELATED PATENT APPLICATION

This application claims the benefit of Korean Patent Application No. 10-2011-0081157, filed on Aug. 16, 2011, in the Korean Intellectual Property Office, the disclosure of which is incorporated herein in its entirety by reference.

BACKGROUND OF THE INVENTION

1. Field of the Invention

The present invention relates to a method and system for processing images, and more particularly, to a method and system for reconstructing a higher resolution image by automatically converting a portion of an image or the whole image into an image having a higher resolution.

2. Description of the Related Art

When expanding a predetermined area of an image or the whole image captured by a user, it is difficult to obtain a clear image by using a simple image processing interpolation method. Thus, as a method of reconstructing images to have a higher resolution, super-resolution based methods have been suggested. In image reconstruction methods based on super-resolution, a special image database such as a database including images obtained by moving a single camera to take a plurality of images of a single scene, is used to reconstruct a higher resolution image of a scene. However, in these super-resolution based methods according to the conventional art, a database of images needs to be provided in advance. Thus, it is difficult for general users to widely use this method for images.

SUMMARY OF THE INVENTION

The present invention provides a method and system for reconstructing a zoom-in image to have a higher resolution, in which a portion of an image or the whole image obtained by a user may be enhanced for detail visual information.

According to an aspect of the present invention, there is provided a method of reconstructing a selected area of an image displayed on an electronic device connected to a network, to be a higher resolution image, the method comprising: receiving a request to expand the selected area; collecting images including the selected area from the Internet; correcting the selected area of the image to be a higher resolution image while expanding the selected area based on the collected images; and displaying the image expanded to have a high resolution on the electronic device.

The method may further comprise: transmitting information about the selected area to a remote server; and transmitting the image expanded to have a high resolution by processing the image in the remote server, to the electronic device, wherein images including the selected area are collected from the Internet via the remote server and the selected area is corrected to have a high resolution based on the collected images while expanding the selected area. The correcting of the selected area to have a high resolution while expanding the selected area based on the collected images may comprise: storing images that are collected from the Internet and include the selected area, in an image database on the remote server; extracting characteristic points that are common between the selected area and the collected images; aligning the collected images to be at particular view points as the view point of the selected area based on the extracted characteristic points; adjusting color, brightness, and contrast of the aligned, collected images to be the same as color, brightness, or contrast of the selected area; expanding the selected area; and combining sub-pixel information included in the adjusted collected images with the expanded image of the selected area.

The images including the selected area may be collected from the Internet in the electronic device, and the selected area may be corrected to have a high resolution based on the collected images while expanding the selected area.

The collecting of the images including the selected area from the Internet may comprise: transmitting information about the selected area to a search server; and receiving images that are collected from the search server and include the selected area. The information about the selected area may include at least one selected from the group consisting of geographic information of a position at which the selected area is obtained, a name of the selected area, and characteristic points extracted from the selected area. The geographic information of the position at which the selected area is obtained may be obtained using a unit such as GPS or by a manual input by a user. The name of the selected image may be obtained by a manual input by the user. The characteristic points extracted from the selected area may be obtained by image processing in an electronic device or a remote server.

The electronic device may be one of a digital camera, a cellular phone, a smartphone, a personal portable terminal, a terminal for digital broadcasting, a portable multimedia player (PMP), a navigation device, a tablet personal computer (PC), a laptop computer, and a desktop computer.

According to another aspect of the present invention, there is provided a high resolution image reconstruction system for expanding a selected area of an image displayed on an electronic device, to be a high resolution image, the system comprising: the electronic device comprising: a display unit for displaying an image; a user input unit to which a request to expand a selected area of the image displayed on the display unit is input; a network communication unit for connecting to the remote server via a network, wherein when a request to expand the selected area is input, information about the selected area and the request for expansion of the selected area are transmitted to the remote server; and the remote server comprising: a network communication unit for connecting to the electronic device via a network; an image database unit for collecting images including the selected area from the Internet and storing the images upon receiving the request to expand the selected area; and a processing unit for correcting the selected image to have a high resolution based on the collected images while expanding the selected image, wherein a high resolution expansion image processed by the processing unit is transmitted to the electronic device.

The processing unit may extract characteristic points that are common between the selected area and the collected images; align the collected images to be at particular view points as the view point of the selected area based on the extracted characteristic points; adjust color, brightness, and contrast of the aligned, collected images to be the same as color, brightness, or contrast of the selected area; expand the selected area; and combine high resolution pixel information included in the adjusted, collected images with the expanded image of the selected area.

The remote server may transmit information about the selected area to a search server, and receive images that are collected from the search server and include the selected area.

According to another aspect of the present invention, there is provided a remote server for connecting to an electronic device displaying an image, via a network, the remote server comprising: a network communication unit for receiving a request to expand a selected image of the image displayed on the electronic device, from the electronic device; an image database unit for collecting images including the selected area from the Internet and storing the images upon receiving the request to expand the selected area; and a processing unit for correcting the selected image to have a high resolution based on the collected images while expanding the selected image, wherein the high resolution expansion image processed by the processing unit is transmitted to the electronic device.

According to another aspect of the present invention, there is provided an electronic device comprising: a display unit for displaying an image; a user input unit to which a request to expand a selected area of the image displayed on the display unit is input; a network communication unit for connecting to the Internet; an image database unit for collecting images including the selected area from the Internet and storing the images upon receiving the request to expand the selected area; and a processing unit for correcting the selected image to a high resolution based on the collected images while expanding the selected image and outputting the processed high resolution expansion image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
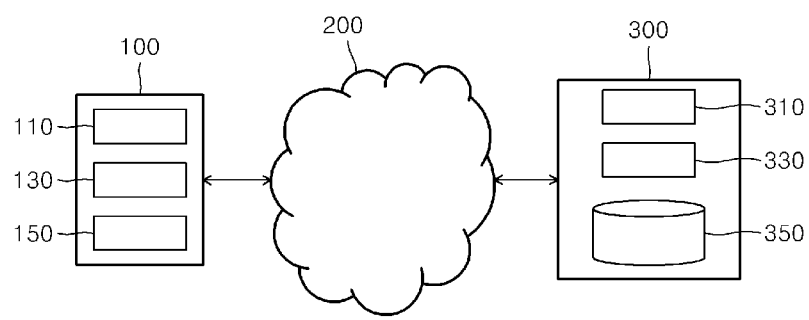
FIG. 1 is a block diagram illustrating a high resolution image reconstruction system according to an embodiment of the present invention.

Expressions such as "at least one of," when preceding a list of elements, modify the entire list of elements and do not modify the individual elements of the list.

The present invention will now be described more fully with reference to the accompanying drawings, in which exemplary embodiments of the invention are shown. In the drawings, like reference numerals denote like elements, and the sizes or thicknesses of elements may be exaggerated for clarity.

Figure 2:
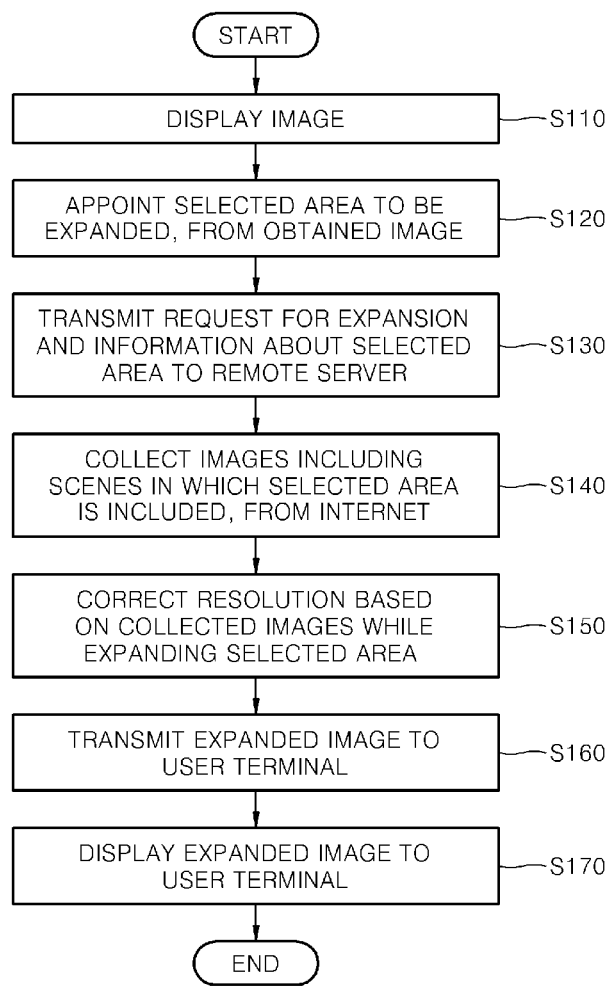
FIG. 2 is a flowchart illustrating a high resolution image reconstruction method performed in the high resolution image reconstruction system of FIG. 1 according to an embodiment of the present invention.

FIG. 1 is a block diagram illustrating a high resolution image reconstruction system according to an embodiment of the present invention. FIG. 2 is a flowchart illustrating a high resolution image reconstruction method performed in the high resolution image reconstruction system of FIG. 1, according to an embodiment of the present invention.

Referring to FIG. 1, the high resolution image reconstruction system includes an electronic device 100 and a remote server 300; the electronic device 100 and the remote server 30 are connected via a network 200.

The electronic device 100 includes a display unit 110 for displaying an image, a user input unit 130 to which a request to expand a selected area of the image displayed on the display unit 110 is input, and a network communication unit 150 for connecting to the remote server 300 via the network 200.

The display unit 110 displays an image obtained by a user and an expanded area of the image, as will be described later. For example, the display unit 110 may display an image captured by using, for example, a digital camera, in a case where the electronic device 100 is a digital camera. The display unit 110 may be at least one of a liquid crystal display (LCD), a thin film transistor-liquid crystal display (TFT-LCD), an organic light-emitting diode (OLED), a flexible display, a transparent display, and a 3D display.

The user input unit 130 generates key input data which the user inputs to request expansion of an image displayed on the display unit 110. Key input data may include coordinates data of an area of the image displayed on the display unit 110 that is to be expanded or a magnification at which the area is to be expanded. The user input unit 130 may be a key pad, a touch pad, or the like. In particular, if the user input unit 130 is a touch pad type and has an interlayer structure with the display unit 110, the user input unit 130 may be referred to as a touch screen.

The network communication unit 150 connects to the remote server 300 via the network 200, and may include at least one of a mobile communication module, a wired Internet module, a wireless Internet module, and a near field communication module. The mobile communication module transmits or receives a wireless signal from or to at least one of a base station, an external terminal, and a server in a mobile communication network. The wired Internet module and the wireless Internet module refer to modules for wired or wireless Internet access. The near field communication module is for near field communication, and may be, for example, a wireless local area network (LAN) card. The wireless LAN card may enable at least one of wireless communications methods such as 802.11, which is the wireless network standard for wireless LAN such as wireless LAN suggested by the Institute of Electrical and Electronics Engineers (IEEE) and some infrared communication, 802.15, which is the standard for wireless personal area network (PAN) including Bluetooth, ultra-wideband (UWB), and Zigbee, 802.16, which is the standard for a wireless metropolitan area network (MAN), broadband wireless access (BWA) including a fixed wireless access (FWA), etc., and 802.20, which is the mobile Internet standard for wireless mobile broadband wireless access (MBWA) including Wibro, WiMAX. The network communication unit 150 may be installed inside the electronic device 100 or outside thereof.

The electronic device 100 according to the current embodiment may further include a unit for obtaining geographic information, such as a global positioning system (GPS)

reception module for receiving a signal transmitted by a GPS. For example, if the electronic device 100 is a digital camera, geographic information may be obtained by using the unit for obtaining geographic information every time the digital camera captures an image.

When a request to expand a selected area of an image is input to the user input unit 130, the network communication unit 150 transmits the request to expand the selected area and information about the selected area, to the remote server 300. Information about the selected area refers to information that characterizes the selected area so as to be searchable on the Internet. For example, if the electronic device 100 is a digital camera including a unit for obtaining geographic information, the information about the selected area may be geographic information obtained when the digital camera captures an image. Alternatively, the information about the selected area may be information that is manually input by the user, such as a position of the selected area or the image including the selected area, a name of the selected area, etc. Alternatively, the information about the selected area may be extracted by image processing of the selected area or the image including the selected area, and thus may be characteristic points that may characterize the selected area.

The network 200 may include a relay device (not shown) that performs a relay function for connecting a plurality of external devices or for connecting a peripheral device and an external communication network (or a network). In the case where a communication protocol of the electronic device 100 which is to be relayed is different from a communication protocol of the remote server 300, the relay device may also convert the protocols. The relay device may be an access point, a gateway, a server, or a combination of these. Also, it is obvious that the electronic device 100 may also be connected directly to the remote server 300 using an ad hoc method or the like.

The remote server 300 includes a network communication unit 310 receiving a request to expand a selected area of an image, from the electronic device 100, an image database unit 350 collecting images including the selected area from the Internet and storing the images upon receiving the request to expand the selected area, and a processing unit 330 correcting the selected area of the image to a high resolution based on the collected images while expanding the selected area.

The network communication unit 310 may include at least one of a mobile communication module, a wired Internet module, a wireless Internet module, and a near field communication module. The mobile communication module, the wired Internet module, the wireless Internet module, and the near field communication module are materially the same as those described with reference to the network communication unit 110 of the electronic device 100, and thus descriptions thereof will not be repeated here.

The network communication unit 310 transmits information about the selected area which is transmitted by the electronic device 100, to a search server (not shown), and receives web images that are collected from the search server and include the selected area. The web images that are collected from the search server and include the selected area are received by the network communication unit 310 and are stored in the image database unit 350. The search server may be included with the remote server 300 or may be provided by a separate search service provider. The information about the selected area transmitted by the search server or the search service provider may be geographic information of an image that is to be expanded, a name of the selected area or the image including the selected area, or characteristic points that may characterize the selected area. As a method in which the search server collects web images including the selected area using the information about the selected area is well-known in the art, a description thereof will be omitted.

The processing unit 330 is a unit performing image processing for correcting the selected area to have a high resolution based on the web images collected via the Internet. For example, the processing unit 330 reconstructs the selected image to be an expanded image (that is, zoom-in image) with a high resolution by extracting characteristic points that are common between the selected area and the collected web images; aligning the collected web images to be at particular view points as the view point of the selected area based on the extracted characteristic points; adjusting color, brightness, and contrast of the aligned, collected web images to be the same as color, brightness, or contrast of the selected area; expanding the selected area; and combining high resolution pixel information included in the adjusted web images with the expanded image of the selected area.

Next, a method of reconstructing a high resolution image by using a high resolution image reconstruction system will be described with reference to FIGS. 1 through 6.

FIGS. 4A through 4D are photographic images of an image that is reconstructed according to operations of the high resolution image reconstruction method of FIG. 2, according to an embodiment of the present invention, and FIGS. 5A through 5F are photographic images of an image that is reconstructed according to operations of the high resolution image reconstruction method of FIG. 2, according to another embodiment of the present invention.

Figure 4A:
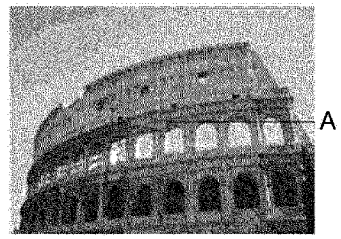
FIGS. 4A through 4D are photographic images of an image that is reconstructed according to operations of the high resolution image reconstruction method of FIG. 2, according to an embodiment of the present invention.
Figure 4B:
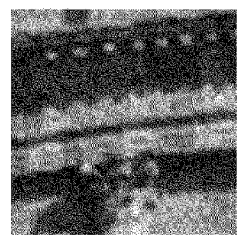
Figure 5A:
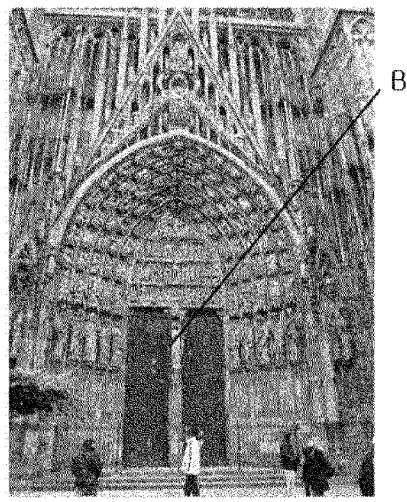
FIGS. 5A through 5F are photographic images of an image that is reconstructed according to operations of the high resolution image reconstruction method of FIG. 2, according to another embodiment of the present invention.

First, when an image is displayed on the display unit 110 of the electronic device 100 in operation S110, the user selects an area to be expanded, from the image displayed on the display unit 110 in operation S120. For example, as illustrated in FIG. 4A, an area A to be expanded may be selected from the image displayed on the display unit 110. FIG. 4B shows the area A that is expanded without correction; the area A has a low resolution and is thus dim. As another example, as illustrated in FIG. 5A, an area B to be expanded may be selected from the image displayed on the display unit 110. When the user appoints an area to be expanded, an expansion magnification may also be appointed together with the area to be expanded. According to circumstances, a default magnification may be assigned.

When an area to be expanded is input to the electronic device 100, a request to expand the selected area is transmitted to the remote server 300 via the network 200 with information about the selected area in operation S130.

Figure 4C:
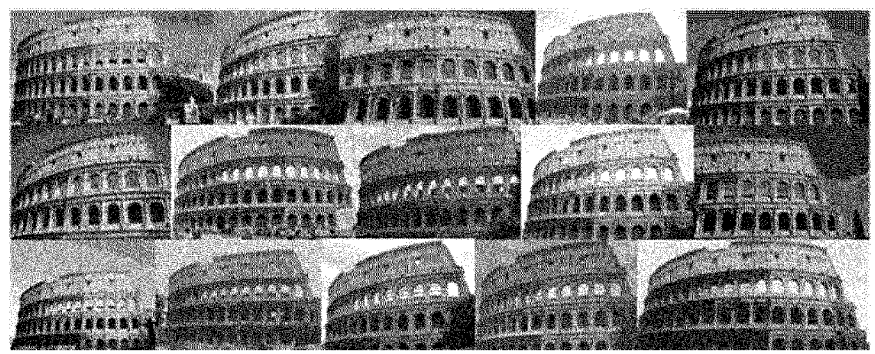
Figure 5B:
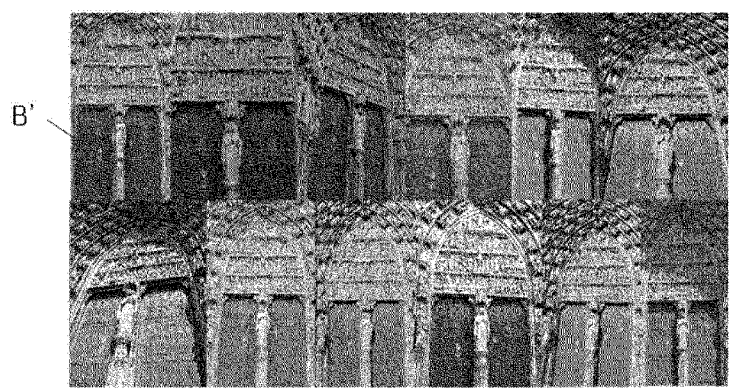

In response to the request for expansion, the remote server 300 collects from the Internet images including scenes in which the selected area is included in operation S140. For example, the network communication unit 310 of the remote server 300 transmits information about the selected area which is transmitted from the electronic device 100 to a search service provider that is previously established on the Internet, and may receive images that include the selected area and are collected from the search service provider. The collected images may be stored in the image database unit 350 of the remote server 300. For example, as illustrated in FIG. 4C, a lot of images including the area A of FIG. 4A may be collected from the Internet. Alternatively, images including the area B of FIG. 5A, which are collected via the Internet, are illustrated in FIG. 5B. Areas B' in FIG. 5B correspond to the area B.

Next, in operation S150, the processing unit 330 performs image processing for correcting the selected area to have a high resolution based on the images collected via the Internet.

Figure 3:
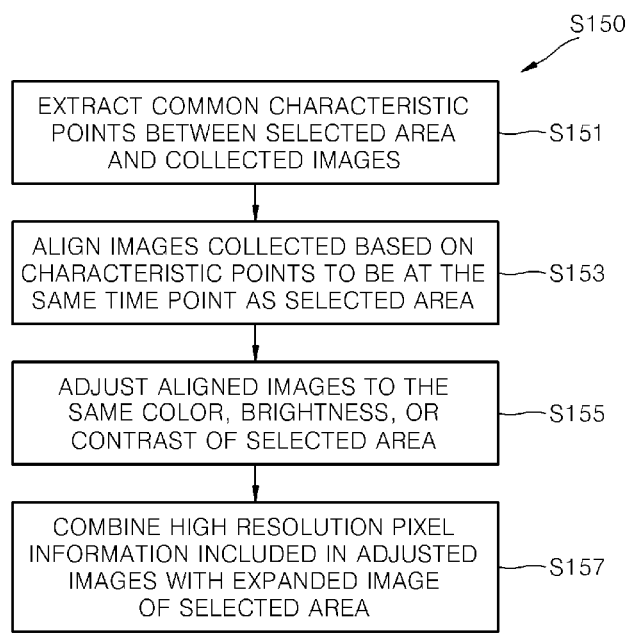
FIG. 3 is a flowchart illustrating an operation of correcting an image to have a high resolution, of the method of FIG. 2, according to an embodiment of the present invention.

An example of image processing of operation S150 of the processing unit 330 is illustrated in FIG. 3.

Figure 5C:
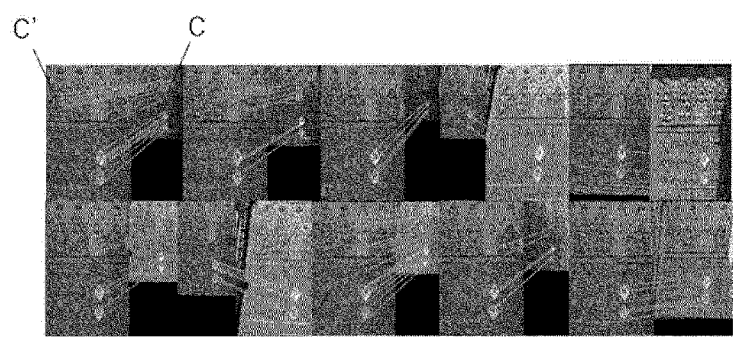

Referring to FIG. 3, in operation S151, the processing unit 330 extracts common characteristic points between the selected area and the collected images. The common characteristic points between the selected area and the collected web images may be extracted by using a scale invariant feature transform (SIFT) algorithm suggested in the field of computer vision. For example, FIG. 5C illustrates characteristic points C in the selected area B and characteristic points C' in the corresponding areas B'.

Figure 4D:
Figure 5D:
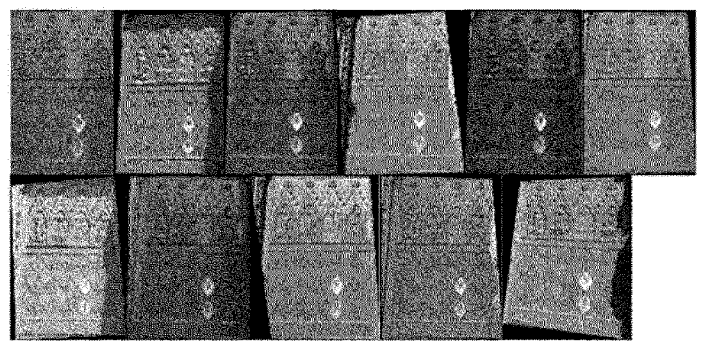
Figure 5E:
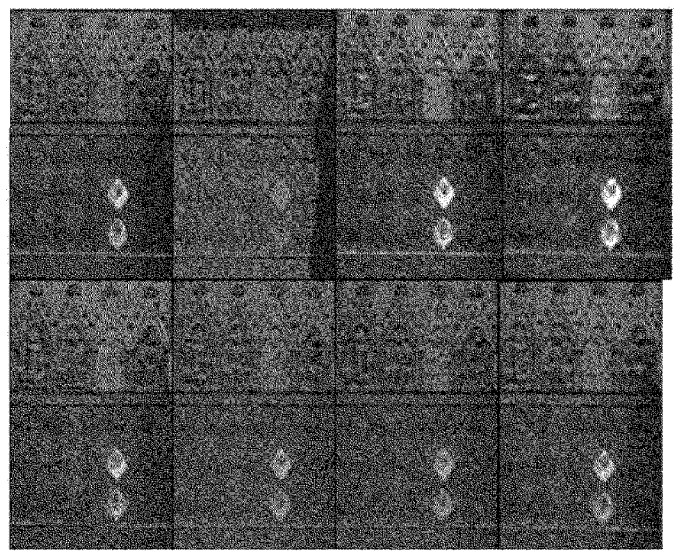
Figure 5F:
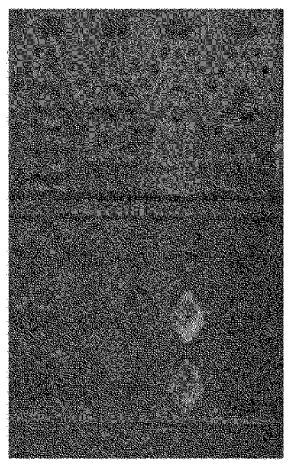

Next, the corresponding areas B' of the collected images are aligned to be at the same time point as the time point of the selected area B based on the extracted characteristic points C and C'. For example, FIG. 5D illustrates the corresponding areas B' of the collected images which are aligned and converted to the same time point as the selected area B. Next, the corresponding areas B' of the collected images are adjusted to have color, brightness, and contrast to be the same as color, brightness, or contrast of the selected area B in operation S155. For example, FIG. 5E illustrates the corresponding areas B' of the collected images adjusted to have the same color, brightness, and contrast as those at the time point of the selected area B. Next, by combining high resolution pixel information included in the adjusted, collected images with the expanded image of the selected area, the selected image is reconstructed to a high resolution expansion image in operation S157. Examples of such images that are expanded with a high resolution are illustrated in FIG. 4D and FIG. 5F. The reconstruction method described with reference to FIG. 3 is an example in which the SIFT algorithm is applied. Other examples of extracting high resolution pixel information from images collected from the Internet and combining the information with expanded images may be those well-known in the art such as a speeded up robust feature (SURF) algorithm and a gradient location and orientation histogram (GLOH) algorithm.

Figure 6:
FIG. 6 is a photographic image of an image that is reconstructed according to a comparative example.

FIG. 6 is a photographic image of an image that is reconstructed according to a comparative example. The photographic image of FIG. 6 is obtained by performing image processing on the selected image B' of FIGS. 5A and 5B by using software using a conventional interpolation method. Compared to FIG. 6, the image expanded according to the method suggested according to the current embodiment of the present invention shown in FIG. 5F is much clearer.

Examples of the electronic device 100 used in the high resolution image reconstruction system according to the current embodiment of the present invention may be a digital camera, a cellular phone, a smartphone, a personal portable terminal, a terminal for digital broadcasting, a portable multimedia player (PMP), a navigation device, a tablet personal computer (PC), a laptop computer, and a desktop computer, which may be widely used by users. For example, when a network-accessible digital camera is used as the electronic device 100 according to the current embodiment of the present invention, a web-zooming function which provides better clarity beyond the limitations of an optical system of a digital camera may be provided compared to that of a typical software zooming function.

Figure 7:
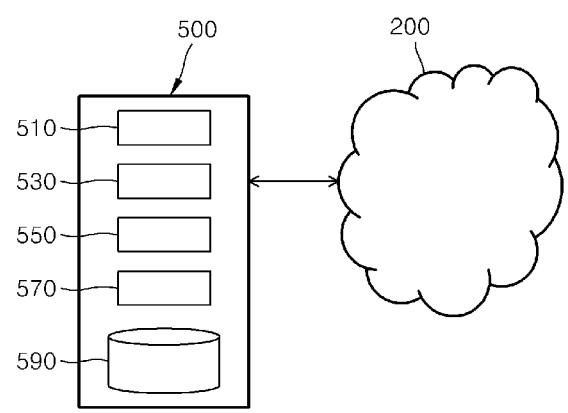
FIG. 7 a block diagram illustrating a high resolution image reconstruction system according to another embodiment of the present invention.
Figure 8:
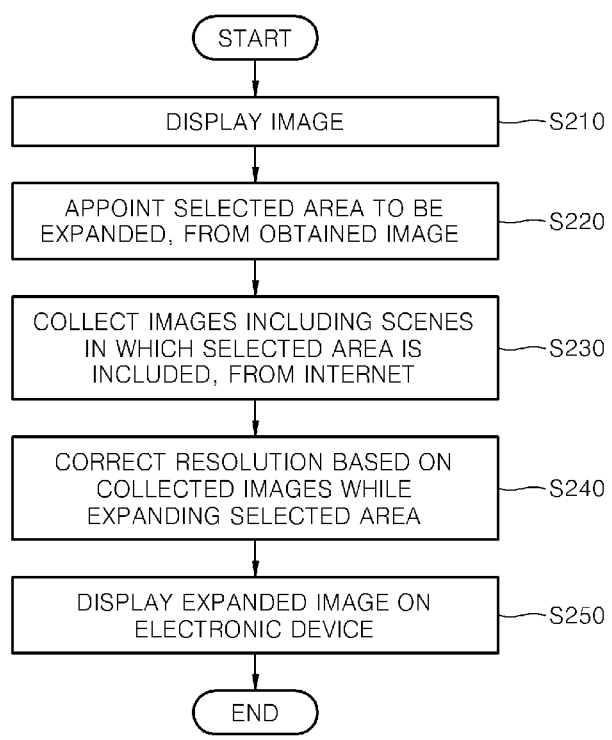
FIG. 8 is a flowchart illustrating a high resolution image reconstruction method performed in the high resolution image reconstruction system of FIG. 7, according to an embodiment of the present invention.

FIG. 7 is a block diagram illustrating a high resolution image reconstruction system 500 according to another embodiment of the present invention. FIG. 8 is a flowchart illustrating a high resolution image reconstruction method performed in the high resolution image reconstruction system 500 of FIG. 7, according to an embodiment of the present invention.

Referring to FIG. 7, the high resolution image reconstruction system 500 includes a display unit 510 displaying an image, a user input unit 530 to which a request to expand a selected area of the image displayed on the display unit 510 is input, a network communication unit 550 for connecting to the Internet, an image database unit 590 collecting images including the selected area from the Internet and storing the images when a request for expansion is input from the user input unit 530, and a processing unit 570 correcting the selected area to have a high resolution based on the collected images while expanding the selected area and outputting the processed high resolution expansion image to the display unit 510.

The system according to the previous embodiment reconstructs high resolution images by using a separate remote server (the remote server 300 of FIG. 1) but the high resolution image reconstruction system 500 according to the current embodiment itself collects a selected image from the Internet and reconstructs the image to have a high resolution. That is, the processing unit 570 and the image database unit 590 of the high resolution image reconstruction system 500 perform substantially the same functions as the processing unit 330 and the image database 350 of the remote server 300 of FIG. 3 according to the previous embodiment. Meanwhile, the display unit 510, the user input unit 530, and the network communication unit 550 are substantially identical to the display unit 310, the user input unit 330, and the network communication unit 350 of the electronic device according to the previous embodiment.

Next, the method of reconstructing high resolution images performed in the high resolution image reconstruction system 500 will be described with reference to FIG. 8.

First, when an image is displayed on the display unit 510 of the high resolution image reconstruction system 500 in operation S210, the user selects an area to be expanded, from the image displayed on the display unit 210 in operation S220. Next, when the area to be expanded is input to the high resolution image reconstruction system 500, images including scenes in which the selected area is included are collected from the Internet based on information about the selected area in operation S230. For example, the network communication unit 210 may transmit the information about the selected area to a search service provider that is previously established on the Internet, and may receive images that include the selected area and are collected from the search service provider. The collected images may be stored in the image database unit 590. Next, the processing unit 570 performs image processing to correct the selected area to have a high resolution based on images collected from the Internet in operation S240. The image processing of operation S240 of the processing unit 570 is substantially the same as the corresponding operation according to the previous embodiment. For example, the image processing operations S151, S153, S155, and S157 described with reference to FIG. 3 may be performed as the image processing operation S240 of the processing unit 570. The images expanded so as to have a high resolution are displayed on the display unit 510.

The high resolution image reconstruction system 500 may be applied to various electronic devices which may be generally used by users such as a digital camera, a cellular phone, a smartphone, a personal portable terminal, a terminal for digital broadcasting, a portable multimedia player (PMP), a navigation device, a tablet PC, a laptop computer, a desktop computer, or the like.

According to the method and system for reconstructing an image to have a high resolution according to the embodiments of the present invention, a high resolution image is automatically reconstructed using images collected via the Internet, and thus, this method and system may also be widely used for images that are obtained by general users.

If the method and system according to the embodiments of the present invention is applied to next-generation digital cameras with an Internet access function according to recent technological trends whereby electronic devices having Internet access have become widespread, it is expected that image processing zooming technology (web-zooming technology) using web images besides optical zooming effects will become possible. Also, images captured using a typical digital camera which is currently used may also be processed using the method and system according to the embodiments of the present invention on personal computers (PCs) with Internet access. Also, the method and system may be applied to various information technology (IT) devices such as smartphones and tablet computers in which digital cameras are integrated.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. such as data transmission through the Internet. The computer readable recording medium can also be distributed over network coupled computer systems so that the computer readable code is stored and executed in a distributed fashion.

While the method and system for reconstructing images to become high resolution images by using web images have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of reconstructing a selected area of an image displayed on an electronic device connected to a network, to be a high resolution image, the method comprising:
   receiving a request to expand the selected area;
   collecting images including the selected area from the Internet and positioning the collected images side by side with one another;
   correcting the selected area to be a high resolution image while expanding the selected area based on the collected images;
   displaying the image expanded to have a high resolution on the electronic device;
   adjusting at least one of color, brightness, and contrast of the corrected image to be the same as either color, brightness, or contrast of the selected area;
   combining sub-pixel information of the adjusted image with the expanded image of the selected area.

2. The method of claim 1, further comprising:
   transmitting information about the selected area to a remote server; and
   transmitting the image expanded to have a high resolution by processing the image in the remote server, to the electronic device,
   wherein images including the selected area are collected from the Internet via the remote server and the selected area is corrected to have a high resolution based on the collected images while expanding the selected area.

3. The method of claim 2, wherein the correcting of the selected area to have a high resolution while expanding the selected area based on the collected images, comprises:
   storing images that are collected from the Internet and include the selected area, in an image database on the remote server;
   extracting characteristic points common between the selected area and the collected images;
   aligning the collected images to be at the same time point as the time point of the selected area based on the extracted characteristic points;
   adjusting at least one of color, brightness, and contrast of the aligned, collected images to be the same as either color, brightness, or contrast of the selected area;
   expanding the selected area; and
   combining high resolution pixel information included in the adjusted collected images with the expanded image of the selected area.

4. The method of claim 1, wherein the images including the selected area are collected from the Internet in the electronic device, and the selected area is corrected to have a high resolution based on the collected images while expanding the selected area.

5. The method of claim 1, wherein the collecting of the images including the selected area from the Internet comprises:
   transmitting information of the selected area to a search server; and
   receiving images that are collected from the search server and include the selected area.

6. The method of claim 5, wherein the information about the selected area includes at least one selected from the group consisting of geographic information of a position at which the selected area is obtained, a name of the selected area, and characteristic points extracted from the selected area.

7. The method of claim 1, wherein a request to expand the selected area includes a position of an area to be expanded from the image displayed on the electronic device and a magnification at which the area is to be expanded.

8. The method of claim 1, wherein the electronic device is one of a digital camera, a cellular phone, a smartphone, a personal portable terminal, a terminal for digital broadcasting, a portable multimedia player (PMP), a navigation device, a tablet personal computer (PC), a laptop computer, and a desktop computer.

9. A high resolution image reconstruction system configured to expand a selected area of an image displayed on an electronic device, to be a high resolution image, the system comprising:
   the electronic device comprising:
      a display unit configured to display an image;
      a user input unit to which a request to expand a selected area of the image displayed on the display unit is input; and
      a network communication unit configured to connect to the remote server via a network, wherein
      in response to a request to expand the selected area being input, information about the selected area and the request to expand the selected area are transmitted to the remote server; and
   the remote server comprising:
      a network communication unit configured to connect to the electronic device via a network;
      an image database unit configured to collect images including the selected area from the Internet and to store the images positioned side by side with one another in response to receiving the request to expand the selected area; and a processing unit configured to
correct the selected area to have a high resolution based on the collected images while expanding the selected area,
adjust at least one of color, brightness, and contrast of the corrected image to be the same as either color, brightness, or contrast of the selected area, and
combine sub-pixel information of the adjusted image with the expanded image of the selected area, wherein
a high resolution expansion image processed by the processing unit is transmitted to the electronic device.

10. The system of claim 9, wherein the processing unit
extracts characteristic points common between the selected area and the collected images;
aligns the collected images to be at the same time point as the time point of the selected area based on the extracted characteristic points;
adjusts at least one of color, brightness, and contrast of the aligned, collected images to be the same as either color, brightness, or contrast of the selected area;
expands the selected area; and
combines high resolution pixel information included in the adjusted, collected images with the expanded image of the selected area.

11. The system of claim 9, wherein the remote server transmits information of the selected area to a search server, and receives images that are collected from the search server and include the selected area.

12. The system of claim 11, wherein the information about the selected area comprises at least one of geographic information of a position at which the selected area is obtained, a name of the selected area, and characteristic points extracted from the selected area.

13. A remote server for connecting to an electronic device displaying an image, via a network, the remote server comprising:
a network communication unit configured to receive a request to expand a selected image of the image displayed on the electronic device, from the electronic device;
an image database unit configured to collect images including the selected area from the Internet and to store the images positioned side by side with one another in response to receiving the request to expand the selected area; and
a processing unit configured to
correct the selected area to have a high resolution based on the collected images while expanding the selected area,
adjust at least one of color, brightness, and contrast of the corrected image to be the same as either color, brightness, or contrast of the selected area, and
combine sub-pixel information of the adjusted image with the expanded image of the selected area,
wherein the high resolution expansion image processed by the processing unit is transmitted to the electronic device.

14. The system of claim 13, wherein the processing unit
extracts characteristic points common between the selected area and the collected web images;
aligns the collected web images at the same time point as the time point of the selected area based on the extracted characteristic points;
adjusts at least one of color, brightness, and contrast of the aligned, collected images to be the same as either color, brightness, or contrast of the selected area;
expands the selected area; and
combines high resolution pixel information included in the adjusted, collected images with the expanded image of the selected area.

15. The remote server of claim 13, wherein the network communication unit transmits information of the selected area to a search server, and receives images that are collected from the search server and include the selected area.

16. The remote server of claim 15, wherein the information about the selected area comprises at least one of geographic information of a position at which the selected area is obtained, a name of the selected area, and characteristic points extracted from the selected area.

17. An electronic device comprising:
a display unit for displaying an image;
a user input unit to which a request to expand a selected area of the image displayed on the display unit is input;
a network communication unit configured to connect to the Internet;
an image database unit configured to collect images including the selected area from the Internet and to store the images positioned side by side with one another in response to receiving the request to expand the selected area; and
a processing unit configured to
correct the selected area to a high resolution based on the collected images while expanding the selected area and outputting the processed high resolution expansion image,
adjust at least one of color, brightness, and contrast of the corrected image to be the same as either color, brightness, or contrast of the selected area, and
combine sub-pixel information of the adjusted image with the expanded image of the selected area.

18. The electronic device of claim 17, wherein the processing unit extracts characteristic points common between the selected area and the collected web images;
aligns the collected images at the same time point as the time point of the selected area based on the extracted characteristic points;
adjusts at least one of color, brightness, and contrast of the aligned, collected images to be the same as either color, brightness, or contrast of the selected area;
expands the selected area; and
combines high resolution pixel information included in the adjusted, collected images with the expanded image of the selected area.

19. The electronic device of claim 17, wherein the network communication unit transmits information of the selected area to a search server, and receives images that are collected from the search server and include the selected area.

20. The electronic device of claim 19, wherein the information about the selected area comprises at least one of geographic information of a position at which the selected area is obtained, a name of the selected area, and characteristic points extracted from the selected area.

21. The electronic device of claim 17, wherein the electronic device is one of a digital camera, a cellular phone, a smartphone, a personal portable terminal, a terminal for digital broadcasting, a portable multimedia player (PMP), a navigation device, a tablet personal computer (PC), a laptop computer, and a desktop computer.

22. The system of claim 9, wherein the image database unit is configured to store the images positioned side by side with one another without overlapping the images.

23. The system of claim 9, wherein the processing unit is configured to detect characteristic points from the selected area and the collected images aligned side by side with one another, the characteristic points including features common to the selected area and the collected images.

24. The system of claim 9, wherein each of the collected images comprises the entire selected area.

25. The system of claim 9, wherein the image database unit stores the collected images in response to receiving a request to expand the selected area, and the processing unit corrects the selected area to the high resolution simultaneous with expanding the selected area.

* * * * *